United States Patent [19]
Narahara

[11] Patent Number: 5,465,241
[45] Date of Patent: Nov. 7, 1995

[54] OPTICAL TAPE RECORDING AND REPRODUCING APPARATUS

[75] Inventor: Tatsuya Narahara, Kanagawa, Japan

[73] Assignee: Sony Corporation, Tokyo, Japan

[21] Appl. No.: 264,625

[22] Filed: Jun. 23, 1994

Related U.S. Application Data

[63] Continuation of Ser. No. 959,674, Oct. 13, 1992, abandoned.

[30] Foreign Application Priority Data

Oct. 14, 1991 [JP] Japan ................... 3-291931

[51] Int. Cl.$^6$ ....................... G11B 7/00
[52] U.S. Cl. ............... 369/44.11; 369/97; 369/44.32
[58] Field of Search ............... 369/44.14, 44.17, 369/44.21, 44.25, 44.28, 44.29, 44.32, 44.35, 119, 112, 97, 44.18, 44.34, 44.11; 250/201.5

[56] References Cited

U.S. PATENT DOCUMENTS

| | | | |
|---|---|---|---|
| 4,466,088 | 8/1984 | Trethewey | 369/44.14 |
| 4,564,757 | 1/1986 | Labudde et al. | 369/44.14 X |
| 4,607,358 | 8/1986 | Maeda et al. | 369/44.29 X |
| 4,782,474 | 11/1988 | Arai et al. | 369/119 X |
| 4,970,707 | 11/1990 | Hara et al. | 369/44.17 X |
| 5,090,001 | 2/1992 | Ito et al. | 369/44.28 |
| 5,155,720 | 10/1992 | Narahara et al. | 369/44.17 X |
| 5,189,653 | 2/1993 | Yanagi | 369/44.34 |
| 5,239,528 | 8/1993 | Narahara et al. | 369/44.35 |

FOREIGN PATENT DOCUMENTS 0112234  5/1987  Japan ................... 369/44.14

Primary Examiner—Aristotelis Psitos
Assistant Examiner—Thang V. Tran
Attorney, Agent, or Firm—Jay H. Maioli

[57] ABSTRACT

An optical tape recording and reproducing apparatus wherein dynamic tracking can be started at a position at or near the center of a track to reduce the settling time upon leading-in of tracking and increase the recording and/or reproducing range and the operating range of a tracking actuator is kept small to achieve save of power and reduction in size of the actuator and besides a sudden variation of the feeding speed of an optical tape is eliminated to minimize the variation of the tension of the optical tape thereby to minimize possible damage to the optical tape. The position of a spot of a laser beam with respect to a object track of the optical tape is controlled in response to a displacement of the position of the spot of the laser beam at a predetermined sampling point of the object track of the optical tape from the center line of the object track and another displacement of the tracking actuator, which effects tracking of the laser beam, from its central position.

6 Claims, 8 Drawing Sheets

| FIG. 3(a) |
| FIG. 3(b) |

OPTICAL TAPE RECORDING AND REPRODUCING APPARATUS

This is a continuation of application Ser. No. 07/959,674 filed Oct. 13, 1992, now abandoned.

BACKGROUND OF THE INVENTION

1. Field of the Invention

This invention relates to an optical tape recording and reproducing apparatus which records and reproduces information onto and from an optical tape by means of an optical head of the rotary scanning type.

2. Description of the Related Art

Various optical tape recording and reproducing apparatus which record and reproduce information onto and from an optical tape by means of an optical head of the scanning type are already known. An exemplary one of conventional optical tape recording and reproducing apparatus is shown in FIG. 7.

Figure 7:
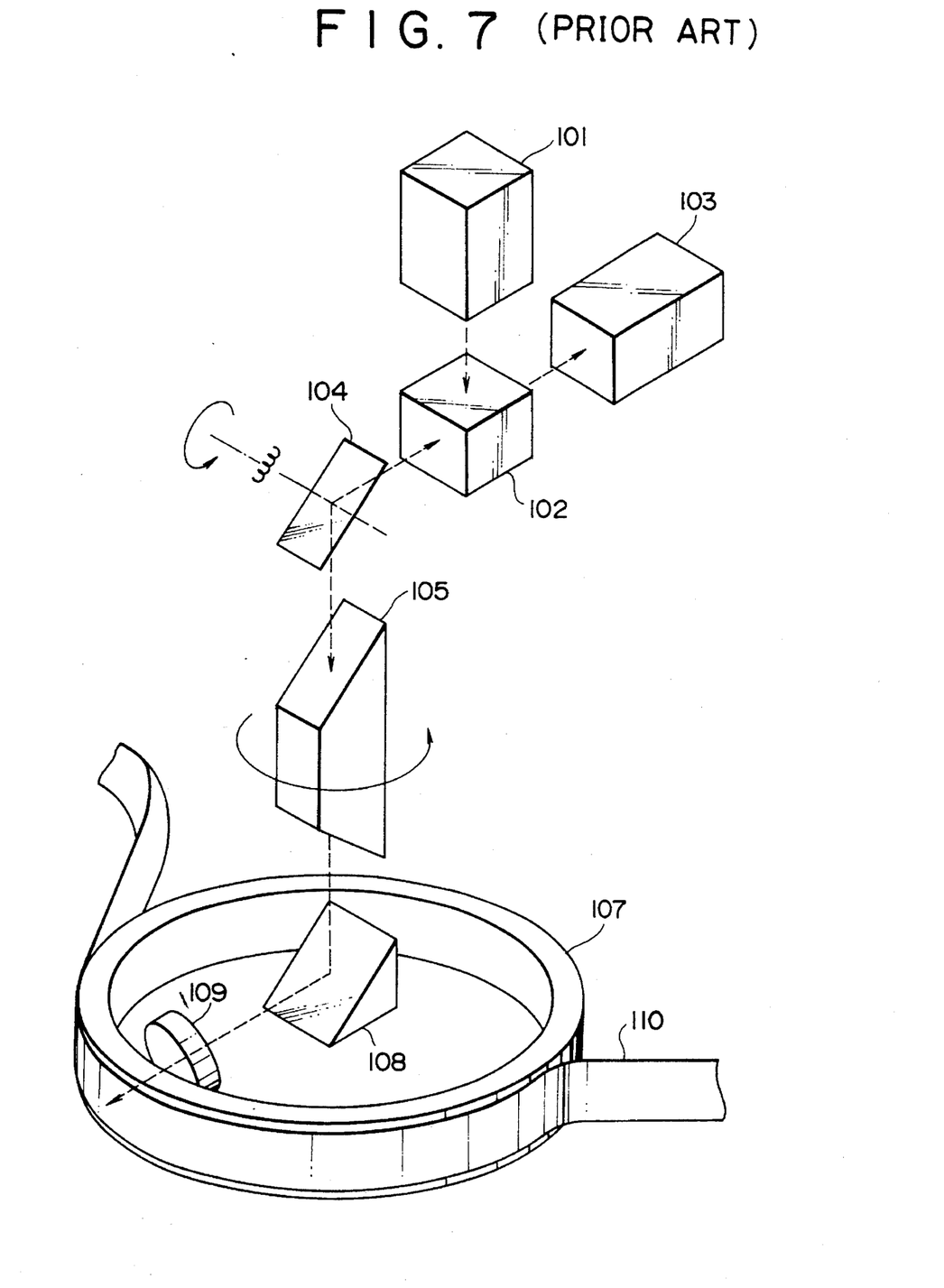
FIG. 7 is a schematic perspective view showing basic construction of an exemplary optical tape recording and reproducing apparatus including an optical head of the rotary scanning type.

Referring to FIG. 7, the conventional optical tape recording and reproducing apparatus shown includes a laser light source section 101, a light beam separator 102, a light receiving section 103, a galvano mirror 104, a roof prism 105, a rotary drum 108 and an objective lens 109. A laser beam oscillated from the laser light source section 101 is converged by way of the light beam separator 102, galvano mirror 104, roof prism 105, rotary mirror 108 and objective lens 109 to an optical tape 110, which is wrapped on and being fed by the rotary drum 107. Reflected light from the optical tape 110 is returned by way of the objective lens 109, rotary mirror 108, roof prism 105, galvano mirror 104 and light beam separator 102 to the light receiving section 103. The components of the apparatus are thus controlled in response to information included in the reflected light received at the light receiving section 103 to record information onto the optical tape 110 or read out information recorded on the optical tape 110 by means of the laser beam.

When to record or reproduce information onto or from the optical tape 110, the laser light source section 101 is activated to emit a laser beam, which is supplied to the light beam separator 102.

The light beam separator 102 reflects, when a laser beam is supplied thereto from the laser light source section 101, the laser beam and supplies it to the galvano mirror 104. On the other hand, when a laser beam is supplied from the galvano mirror 104, the light beam separator 102 passes the laser beam therethrough and supplies the same to the light receiving section 103.

The light receiving section 103 includes a plurality of light receiving elements and receives, when a laser beam is supplied thereto from the light beam separator 102, the laser beam by means of the light receiving elements to produce a plurality of light reception signals, which are supplied to a controlling system or a reproducing system not shown of the optical tape recording and reproducing apparatus.

The galvano mirror 104 is controlled to change its angular position in response to a driving signal from the controlling system. At the angular position thus controlled, the galvano mirror 104 reflects a laser beam supplied thereto from the light beam separator 102 and supplies the same to the roof prism 105 or reflects a laser beam supplied thereto from the roof prism 105 and supplies the same to the light beam separator 102.

The roof prism 105 is driven to rotate by a rotator motor not shown to assure matching between a rotary optical system including the rotary mirror 108 and so forth and a stationary optical system including the galvano mirror 104 and so forth. When a laser beam is supplied from the galvano mirror 104 to the roof prism 105 while the roof prism 105 is being driven to rotate by the rotator motor, the roof prism 105 takes in the laser beam, and supplies it to the rotary mirror 108, but when a laser beam is supplied from the rotary mirror 108, the roof prism 105 takes in the laser beam and supplies it to the galvano mirror 104.

If the angular position of the galvano mirror 104 is changed during the operation, then a spot of laser light formed on the optical tape 110 is moved in a tracking direction in response to the change of the angular position.

The rotary drum 107 has a head face on which the optical tape 110 is to be wrapped and a drum motor for driving the head face to rotate at a speed equal to twice that of the roof prism 105. The drum motor operates in response to a driving signal supplied thereto from the controlling system to rotate the head face at the speed equal to twice that of the roof prism 105.

The rotary mirror 108 is disposed at a central portion of the rotary drum 107 and is rotated integrally with the rotary drum 107. When a laser beam is supplied from the roof prism 105 to the rotary mirror 108 while the rotary drum 107 is rotating together with the rotary drum 107, the rotary mirror 108 reflects the laser beam and supplies it to the objective lens 109, but on the contrary when a laser beam is supplied from the objective lens 109, the rotary mirror 108 reflects the laser beam and supplies it to the roof prism 107.

The objective lens 109 is disposed at a peripheral portion of the rotary drum 107 and is rotated integrally with the rotary drum 107. When a laser beam is supplied from the rotary mirror 107 to the objective lens 109 while the objective lens 109 is rotating together with the rotary drum 107, the object lens 109 takes in the laser beam and converges it upon the optical tape 110 which is wrapped on and is being fed by the rotary drum 107. The objective lens 109 takes in reflected light from the optical tape 110 then and supplies it to the rotary mirror 108.

With the optical tape recording and reproducing apparatus described above, however, a tracking error is obtained but only intermittently as different from an optical disk apparatus and so forth. Accordingly, in most cases, a tracking error signal at the point of time when feeding of the optical tape is started is sampled and a tape feeding motor is driven in response to a result of such sampling to finely adjust the feeding speed of the optical tape so that dynamic tracking movement by means of a tracking actuator is started from the center of a track and tracking movement is performed successively without track jumping.

According to the method, however, a track passing phase is controlled in response to a tracking error signal at a scanning starting position in place of a CTL signal, which is employed for CTL servoing in an ordinary magnetic video tape recorder apparatus, and dynamic tracking is additionally employed to effect tracking control in order to eliminate such a trouble as track jumping as described above.

With the method, however, since an optical tape, which is a resilient body, is moved and positioned by means of a motor having great inertia, the responsibility is low, and upon adjustment of the feeding speed, a sudden variation of the tension of the optical tape occurs and may damage the optical tape. Thus, it is a problem that it is difficult to effect stabilized servo feeding control.

A solution to the problem has been proposed wherein the feeding speed of an optical tape is fixed and a spot of a laser beam is kept at a next track entering position by means of a tracking actuator (for example, the galvano mirror 104 in the optical tape recording and reproducing apparatus shown in FIG. 7) which can be driven at a high speed at a region in which the optical tape is not wrapped on a rotary drum, and when the optical tape comes to the position, the tracking actuator is changed over to dynamic tracking.

With the solution, however, when the speed upon recording or reproduction is displaced a little or when some elongation or contraction of an optical tape occurs, a displacement of the track passing phase is accumulated so that the operating range of the actuator becomes very great. Consequently, an actuator must be employed which has the contradictory characteristics that it operates at a high speed and that it has a large range of movement. Accordingly, there is a problem that an actuator having such characteristics must be developed.

SUMMARY OF THE INVENTION

It is an object of the present invention to provide an optical tape recording and reproducing apparatus wherein dynamic tracking can be started at a position at or near the center of a track and consequently the settling time upon leading in of tracking can be reduced and the recording and/or reproducing range can be increased.

It is another object of the present invention to provide an optical tape recording and reproducing apparatus wherein the operating range of a tracking actuator is kept small to achieve save of power and reduction in size of the actuator.

It is a further object of the present invention to provide an optical tape recording and reproducing apparatus wherein a sudden variation of the feeding speed of an optical tape is eliminated to minimize the variation of the tension of the optical tape thereby to minimize possible damage to the optical tape.

In order to attain the objects, according to the present invention, there is provided an optical tape recording and reproducing apparatus, which comprises means for feeding an optical tape along a predetermined path, a laser light source for producing a laser beam, an optical system for focusing the laser beam from the laser light source upon an object track of the optical tape to optically record or reproduce information onto or from the optical tape and for introducing the laser beam reflected from the optical tape, the optical system including a tracking actuator mounted for movement from its central position to effect tracking of the laser beam, first detecting means for detecting a displacement of the position of a spot of the laser beam at a predetermined sampling point of the current object track of the optical tape from the center line of the object track, second detecting means for detecting a displacement of the tracking actuator from the central position, and control means for controlling the position of the spot of the laser beam with respect to a next object track of the optical tape in response to the displacements detected by the first and second detecting means.

In the optical tape recording and reproducing apparatus, the position of a spot of a laser beam with respect to a next object track of an optical tape is controlled in response to a displacement of the position of the spot of the laser beam at the predetermined sampling point of a current object track of the optical tape from the center line of the object track and another displacement of the tracking actuator from its central position. Consequently, dynamic tracking can be started at a position at or in the proximity of the center of the next object track of the optical tape. Accordingly, the settling time upon leading-in of tracking is minimized, and the recording or reproduction range is increased. Further, the operation range of the tracking actuator is kept small to achieve saving of power and miniaturization of the tracking actuator. In addition, a sudden variation of the feeding speed of the optical tape is eliminated to reduce the variation of the tension of the optical tape so that otherwise possible damage to the optical tape is minimized.

The above and other objects, features and advantages of the present invention will become apparent from the following description and the appended claims, taken in conjunction with the accompanying drawings in which like parts or elements are denoted by like reference characters.

BRIEF DESCRIPTION OF THE INVENTION

FIG. 3(*a–b*) is a block diagram of a tracking controlling circuit of a control circuit of the optical tape recording and reproducing apparatus shown in FIG. 1;

FIG. 5(*a–c*) is a waveform diagram illustrating a tracking operation of the optical tape recording and reproducing apparatus shown in FIG. 1;

DETAILED DESCRIPTION OF THE PREFERRED EMBODIMENT

Figure 1:
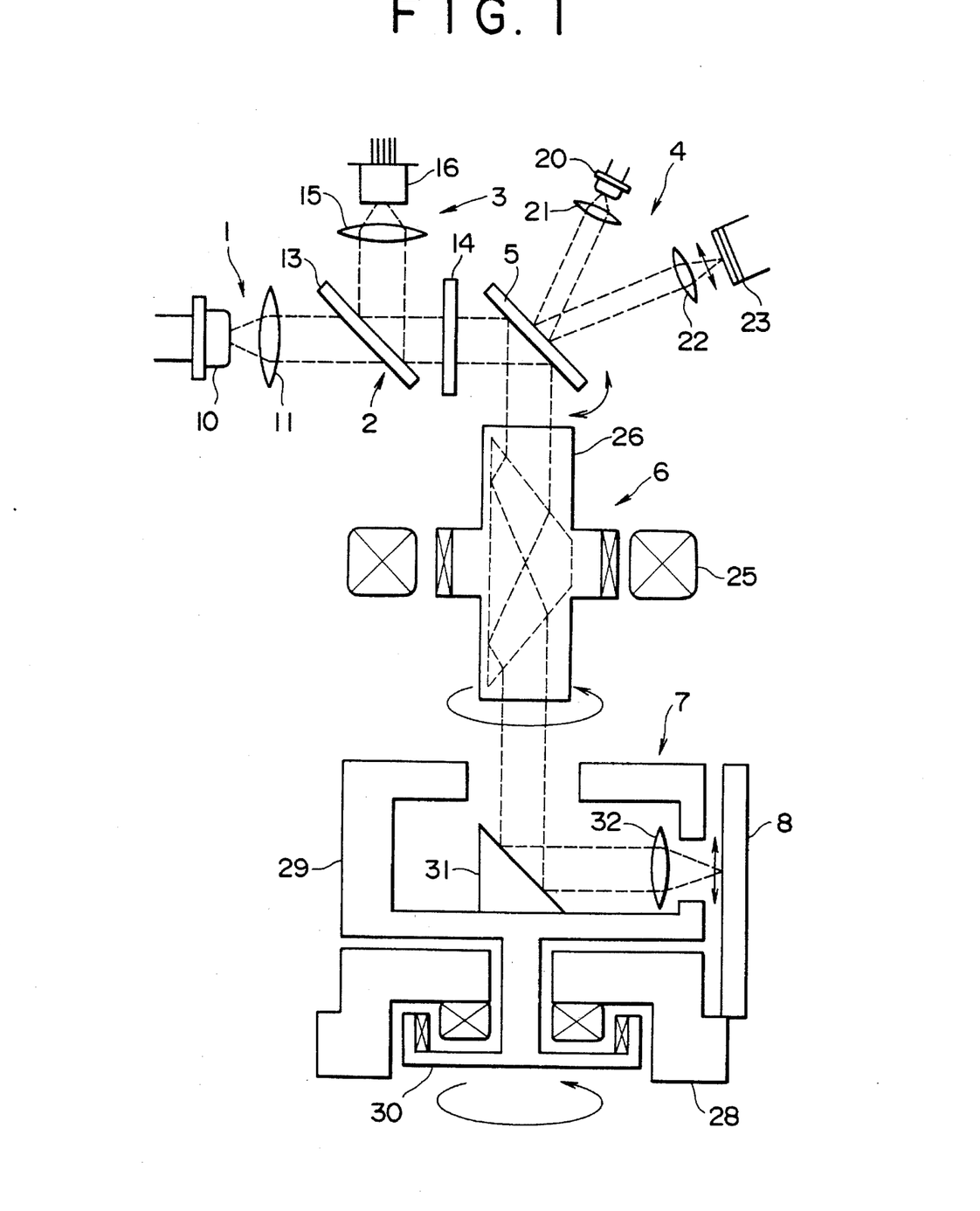
FIG. 1 is a schematic view of an optical system of an optical tape recording and reproducing apparatus to which the present invention is applied.

Referring first to FIG. 1, there is shown an optical system of an optical tape recording and reproducing apparatus to which the present invention is applied. The optical system of the optical tape recording and reproducing apparatus shown includes a laser light source section 1, a light beam separating section 2, a light receiving section 3, a mirror angle detecting section 4, a galvano mirror 5, a roof prism section 6, and a rotary drum section 7. A laser beam oscillated from the laser light source section 1 is converged by way of the light beam separator 2, galvano mirror 5 and roof prism section 6 upon an optical tape 8, which is wrapped on and fed by the rotary drum section 7, and reflected light from the optical tape 8 then is taken into the rotary drum section 7 and returned by way of the roof prism section 6, galvano mirror 5 and light beam separating section 2 to the light receiving section 3. The components of the optical tape recording and reproducing apparatus are thus controlled in response to information included in the reflected light received at the light receiving section 3 to record information onto the optical tape 8 or read out information recorded on the optical tape 8 by means of the laser beam.

The laser light source section 1 includes a semiconductor laser 10 for emitting a laser beam when information is to be recorded onto or reproduced from the optical tape 8, and a collimate lens 11 for converting a laser beam emitted from the semiconductor laser 10 into a parallel laser beam. Thus, a laser beam oscillated by the semiconductor laser 10 is converted into a parallel laser beam by the collimate lens 11 and then supplied to the light beam separating section 2.

The light beam separating section 2 includes a polarized beam splitter (PBS) 13 for passing, when a laser beam is supplied thereto from the laser light source section 1, the laser beam therethrough and supplying it to the galvano mirror 5 and for reflecting, when a laser beam, which is polarized by one half wavelength with respect to a laser beam from the laser light source section 1, is supplied thereto from the galvano mirror 5, the laser light and supplying the same to the light receiving section 3, and a quarter wavelength plate 14 for polarizing, when a laser beam is supplied thereto from the polarized beam splitter 13, the laser beam by one quarter wavelength and supplying the same to the galvano mirror 5 and for polarizing, when a laser beam is supplied thereto from the galvano mirror 5, the laser beam by one quarter length and supplying the same to the galvano mirror 5. When a laser beam is supplied from the laser light source section 1 to the light beam separating section 2, the light beam separating section 2 polarizes the light beam by one quarter wavelength and supplies the thus polarized light beam to the galvano mirror 5, but on the other hand, when a laser beam, which is polarized by one quarter wavelength with respect to a laser beam from the laser light source section 1, is supplied from the galvano mirror 5 to the light beam separating section 2, the light beam separating section 2 polarizes the laser beam further by one quarter wavelength and supplies the thus polarized laser beam to the light receiving section 3.

The light receiving section 3 includes a detecting converging lens 15 for converging a laser beam supplied thereto from the light beam separating section 2, and a multi-division detector 16 including a plurality of light receiving elements not shown for receiving a laser beam converged by the detecting converging lens 15 and outputting light reception signals from the individual light receiving elements. When a laser beam is supplied from the light beam separator 2 to the light receiving section 3, the light receiving section 3 receives the laser beam by means of the light receiving elements of the multi-division detector 16 and produces a plurality of light reception signals, which are supplied to a control circuit not shown in FIG. 1.

Meanwhile, the mirror angle detecting section 4 includes a semiconductor laser 20 for emitting a laser beam when information is to be recorded onto or reproduced from the optical tape 8, a collimate lens 21 for converting a laser beam emitted from the semiconductor laser 20 into a parallel laser beam and supplying the parallel laser beam to the rear face of the galvano mirror 5, a converging lens 22 for converging a laser beam reflected from the rear face of the galvano mirror 5, and a position detecting element (for example, S1543 by Hamamatsu Photonics Company) 23 for receiving a laser beam converged by the converging lens 22 and producing a one-dimensional position signal, which represents a displacement of the galvano mirror 5 from the central position, corresponding to the position of a spot of the laser beam. A laser beam emitted from the semiconductor laser 20 is converted into a parallel laser beam by the collimate lens 21 and supplied to the rear face of the galvano mirror 5, and then, the laser beam reflected by the rear face of the galvano mirror 5 is converged by the converging lens 22 upon the light receiving face of the position detecting element 23, from which a one-dimensional position signal is produced in accordance with the position of a spot of the laser beam and supplied to the control circuit.

The galvano mirror 5 is driven in response to a driving signal from the control circuit so that the angular position thereof is controlled. When the galvano mirror 5 assumes an angular position in accordance with the controlling signal from the control circuit, it reflects, at the rear face thereof, a laser beam supplied thereto from the mirror angle detecting section 4 and returns it to the mirror angle detecting section 4 while it reflects another laser light supplied thereto from the light beam separating section 2 and supplies it to the roof prism section 6 and further reflects a laser beam supplied thereto from the roof prism section 6 and supplies it to the light beam separating section 2.

The roof prism section 6 includes a rotator motor 25 having a rotor which rotates at a speed in accordance with a driving signal outputted from the control circuit, and a roof prism 26 driven to rotate by the rotator motor 25 to effect matching between the rotary optical system on the rotary drum section 7 side and the stationary optical system on the galvano mirror 5 side. The rotator motor 25 operates in response to a driving signal outputted from the control circuit to rotate the roof prism 26, and when a laser beam is supplied from the galvano mirror 5 to the roof prism section 6, the roof prism section 6 takes in the laser beam and supplies it to the rotary drum section 7. On the other hand, when a laser beam is supplied from the rotary drum section 7 to the roof prism section 6, the roof prism section 6 takes in the laser beam and supplies it to the galvano mirror 5.

The rotary drum section 7 includes a fixed drum 28 secured to a chassis or the like not shown, a rotary drum 29 mounted for rotation on the fixed drum 28 and having a peripheral face on which the optical tape 8 is to be wound, a drum motor 30 for driving the rotary drum 29 to rotate at a speed equal to twice that of the roof prism 26 in response to a driving signal outputted from the control circuit, a mirror 31 disposed at a central portion of the rotary drum 29 for integral rotation with the rotary drum 29 for reflecting, when a laser beam is supplied thereto from the roof prism section 6, the laser beam and supplying the same to a peripheral portion of the rotary drum 29 and for reflecting, when a laser beam is supplied thereto from the peripheral portion of the rotary drum 29, the laser beam and supplying the same to the roof prism section 6, and an objective lens 32 disposed at a peripheral portion of the rotary drum 29 for integral rotation with the rotary drum 29 for taking in, when a laser beam is supplied thereto from the mirror 31, the laser beam and converging the same upon the optical tape 8, which is wrapped on and is being fed by the rotary drum 29, and for taking in laser light reflected from the optical tape 8 and supplying the same to the mirror 31.

When a laser beam is supplied from the roof prism section 6 while the drum motor 30 is energized to drive the rotary drum 29 to rotate in response to a driving signal outputted from the control circuit, it is reflected by the mirror 31 mounted on the rotary drum 29 and is converged upon the optical tape 8 wrapped on the rotary drum 29 by the objective lens 32. Then, the laser beam reflected from the optical tape 8 is converted into a parallel laser beam by the objective lens 32 and then reflected by and supplied from the mirror 31 to the roof prism section 6.

Figure 2:
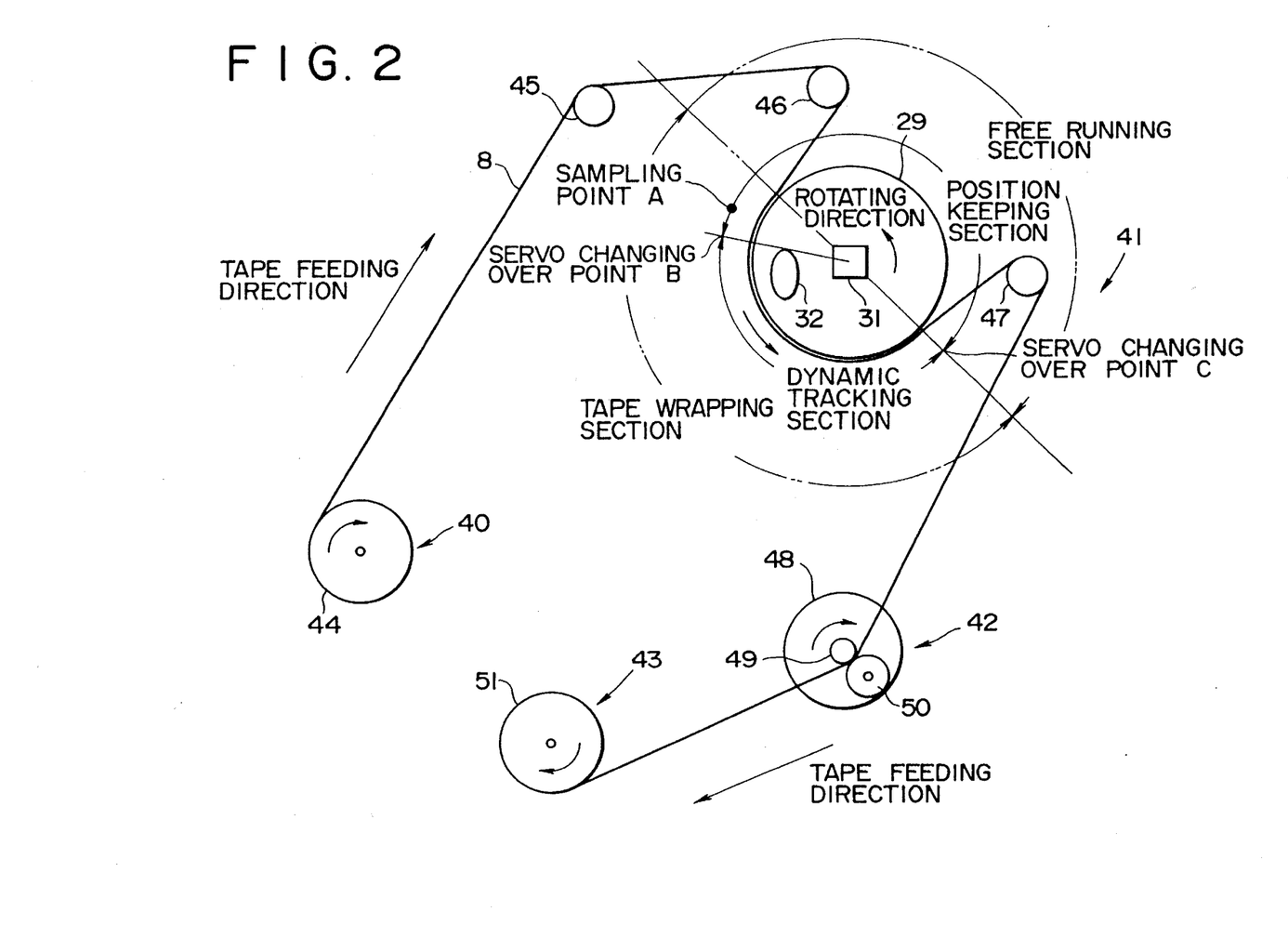
FIG. 2 is a schematic view of a tape feeding mechanism of the optical tape recording and reproducing apparatus shown in FIG. 1.

Referring now to FIG. 2, there is shown a tape feeding mechanism of the optical tape recording and reproducing apparatus described above. The tape feeding mechanism of the optical tape recording and reproducing apparatus shown includes a tape supplying section 40, a tape guide section 41, a tape feeding section 42, and a tape take-up section 43. The optical tape 8 is fed by the tape feeding section 42 so that it is drawn out from the tape supplying section 40 and supplied to the rotary drum 29 by way of the tape guide section 41 while a portion of the optical tape 8 for which recording or reproduction of information has completed by means of the rotary drum 29 is taken up onto the tape take-up section 43.

The tape supplying section 40 includes a supply reel 44 on which the optical tape 8 is wrapped in advance. When the optical tape 8 is pulled by the tape feeding section 42, it is supplied from the supply reel 44 to the tape guide section 41.

The tape guide section 41 includes a guide 45 located in the proximity of the rotary drum 29 for drawing out the optical tape 8 from the tape supplying section 40 and for keeping the delivering position of the optical tape 8 fixed, an entrance guide 46 provided adjacent the rotary drum 29 remote from the tape supplying section 40 and the tape take-up section 43 for guiding the optical tape 8 delivered thereto by way of the guide 45 to the rotary drum 29, and an exit guide 47 provided adjacent the rotary drum 29 remote from the tape supplying section 40 and the tape take-up section 43 for cooperating with the entrance guide 46 to wrap the optical tape 8 helically on the rotary drum 29 over the range of 180 degrees and for guiding the optical tape 8 delivered from the rotary drum 29 thereto to the tape feeding section 42. Thus, while the delivering position of the optical tape 8 delivered from the tape supplying section 40 is kept fixed by means of the guide 45, the optical tape 8 is wrapped around the rotary drum 29 over the range of 180 degrees by the entrance guide 46 and the exit guide 47, and the optical tape 8 delivered from the rotary drum 29 is folded back by the exit guide 47 and supplied to the tape feeding section 42.

The tape feeding section 42 includes a capstan motor 48 for generating a turning force at a speed in accordance with a driving signal supplied thereto from the control circuit, a capstan shaft 49 for being driven to rotate by the driving force obtained from the capstan motor 48, and a pinch roller 50 for pressing the optical tape 8 supplied from the tape guide section 41 against the capstan shaft 49. While the optical tape 8 is pressed against the capstan shaft 49 by the pinch roller 50, the capstan motor 48 is driven in accordance with a driving signal outputted from the control circuit so that the capstan shaft 49 is driven to rotate by the rotational driving force obtained by the capstan motor 48 to feed the optical tape 8 to the tape take-up section 43.

The tape take-up section 43 includes a take-up reel 51 for being driven to rotate in accordance with a driving signal outputted from the control circuit to take up the optical tape 8. Thus, the take-up reel 51 is rotated in response to a driving signal outputted from the control circuit to take up the optical tape 8 delivered from the tape feeding section 42.

Figure 3:
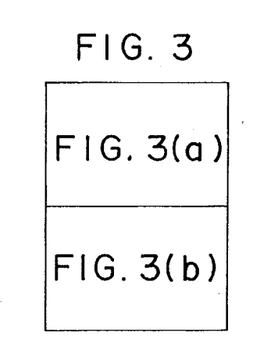
Figure 3A:
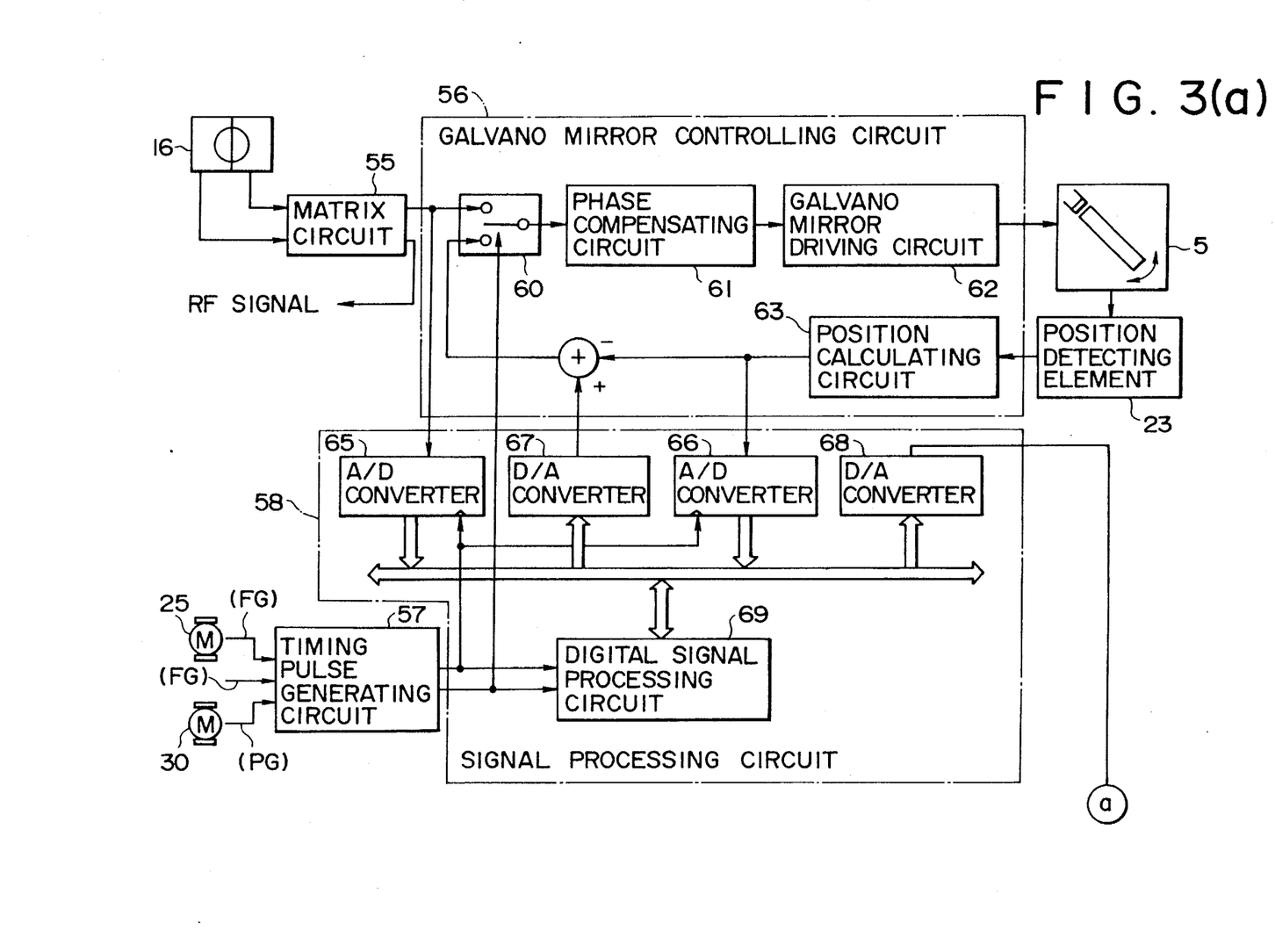
Figure 3B:
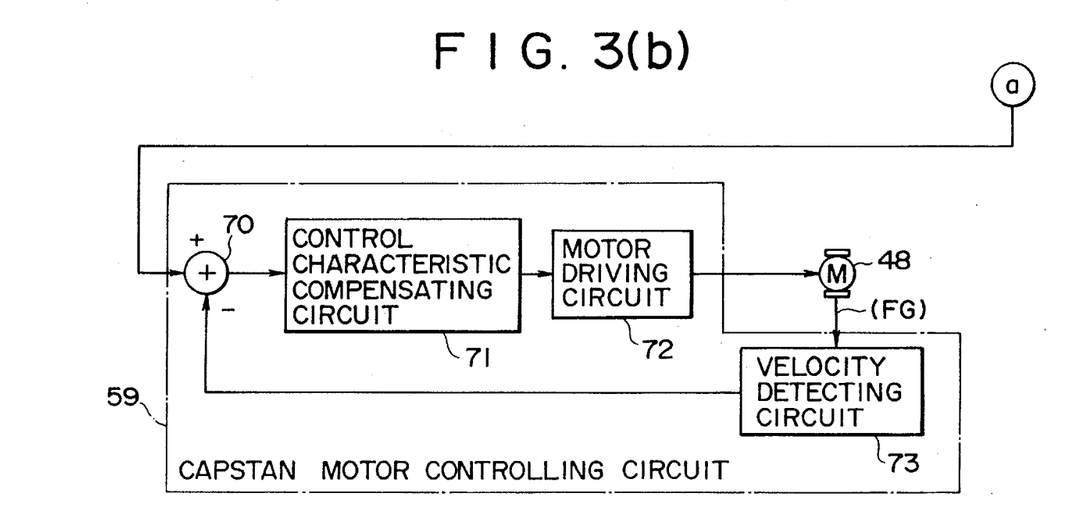

Referring now to FIG. 3, there is shown a tracking controlling circuit for performing tracking control in the control circuit of the optical tape recording and reproducing apparatus described above. The tracking controlling circuit shown includes a matrix circuit 55, a galvano mirror controlling circuit 56, a timing pulse generating circuit 57, a signal processing circuit 58, and a capstan motor controlling circuit 59. The tracking controlling circuit effects processing of producing a RF signal in response to reception signals from the multi-division detector 16, a PG signal from a pulse signal generator provided for the rotator motor 25, a PG signal from a pulse signal generator provided for the drum motor 30, a FG signal from a frequency signal generator provided for the drum motor 30, a one-dimensional position signal from the position detecting element 23 and a FG signal from a frequency signal generator provided for the capstan motor 48 and supplying the thus produced RF signal to a reproducing circuit not shown, tracking servo processing for producing various driving signals to control the galvano mirror 5 and the capstan motor 48, and so forth.

The matrix circuit 55 produces a corresponding RF signal from reception signals supplied thereto from the multi-division detector 16 and supplies the same to the reproducing circuit and so forth, and further processes the reception signals in accordance with a preset method such as, for example, a push-pull method to produce and supply a tracking error signal to the galvano mirror controlling circuit 56 and the signal processing circuit 58.

In this instance, the tracking error signal is a signal representative of a zero crossing point when the track pitch is equal to one period and the center of a track provided on the optical tape 8 and the center of a spot of a laser beam focused upon the track coincide with each other, and a relative position between the track and the spot is represented by a value of the tracking error signal.

The galvano mirror controlling circuit 56 includes a multiplexer circuit 60, a phase compensating circuit 61, a galvano mirror driving circuit 62, a position calculating circuit 63 and a subtracting circuit 64. When a signal from the timing pulse generating circuit 57 represents that the rotary drum 29 is within a position holding section from the point C to the point B shown in FIG. 2, the angular position of the galvano mirror 5 is adjusted to an angular position indicated by a value of a position reference signal supplied thereto from the signal processing circuit 58. On the other hand, when the signal from the timing pulse generating circuit 57 that the rotary drum 29 is within a dynamic tracking section from the point B to the point C shown in FIG. 2, the galvano mirror 5 is controlled in a closed loop to control the angular position of the galvano mirror 5 in a dynamic fashion so that the position of the spot of the laser beam and the position of the track may coincide with each other.

The multiplexer circuit 60 of the galvano mirror controlling circuit 56 selects, when a position holding section signal is supplied thereto from the timing pulse generating circuit 57, a relative position difference signal outputted from the subtracting circuit 64 and supplies it to the position compensating circuit 61. On the other hand, when a dynamic tracking section signal is supplied from the timing pulse generating circuit 57 to the multiplexer circuit 60, the multiplexer circuit 60 selects a tracking error signal outputted from the matrix circuit 55 and supplies it to the phase compensating circuit 61.

The phase compensating circuit 61 compensates, when a relative position difference signal or a tracking error signal is supplied thereto from the multiplexer circuit 60, for the phase of the relative position difference signal or the tracking error signal to produce a galvano mirror angle indicating signal and supplies it to the galvano mirror driving circuit 62.

The galvano mirror driving circuit 62 produces, when a galvano mirror angle indicating signal is supplied thereto from the phase compensating circuit 61, a driving signal in accordance with the galvano mirror angle indicating signal and supplies the thus produced driving signal to a driving coil not shown of the galvano mirror 5 to adjust the angular position of the galvano mirror 5 to the value indicated by the galvano mirror angle indicating signal supplied thereto.

The position calculating signal 63 effects position calculation in accordance with a one-dimensional position signal supplied thereto from the position detecting element 23 to produce a position signal representative of an angular position of the galvano mirror 5 (the angular position represents the position of a spot of a laser beam focused upon the optical tape). The position signal thus produced is supplied to the subtracting circuit 64 and the signal processing circuit 58.

The subtracting circuit 64 calculates a difference between a position reference signal supplied thereto from the signal processing circuit 58 and a position signal supplied thereto from the position calculating circuit 63 to produce a relative position difference signal and supplies the relative position difference signal to the multiplexer circuit 60.

The timing pulse generating circuit 57 produces a position holding section signal or a dynamic tracking section signal in response to a PG signal from the pulse signal generator provided for the rotator motor 25, another PG signal from the pulse signal generator provided for the drum motor 30 and a FG signal from the frequency signal generator provided for the drum motor 30, and supplies the position holding section signal or the dynamic tracking section signal thus produced to the multiplexer circuit 60 and the signal processing circuit 58. The timing pulse generating circuit 57 further produces a sampling instruction signal and supplies it to the signal processing circuit 58 when the rotary drum 29 comes to its sampling position (point A shown in FIG. 2).

The signal processing circuit 58 includes a pair of analog to digital (A/D) converters 65 and 66, a pair of digital to analog (D/A) converters 67 and 68 and a digital signal processing circuit 69. The signal processing circuit 58 produces various driving signals in response to a tracking error signal from the matrix circuit 55, a position holding section signal or a dynamic tracking section signal and a sampling instruction signal outputted from the timing pulse generating circuit 57, and a position signal from the galvano mirror controlling circuit 56 to control the galvano mirror 5 and the capstan motor 48 to cause a spot of a laser beam focused upon the optical tape 8 to track an object track for recording or reproduction.

The A/D converting circuit 64 fetches, when a sampling instruction signal is supplied thereto from the timing pulse generating circuit 57, a tracking error signal supplied thereto from the matrix circuit 55, converts the thus fetched tracking error signal from an analog into a digital signal and supplies the digital tracking error signal to the digital signal processing circuit 69.

The other A/D converting circuit 66 fetches, when a sampling instruction signal is supplied thereto from the timing pulse generating circuit 57, a position signal supplied thereto from the position calculating circuit 63, converts the thus fetched position signal from an analog into a digital signal and supplies the digital position signal to the digital signal processing circuit 69.

The digital signal processing circuit 69 fetches, when a sampling signal is supplied thereto from the timing generating circuit 57, a tracking signal and a position signal outputted from the A/D converting circuits 65 and 66, respectively, time integrates the tracking error signal, produces a new reference position signal in accordance with a result of the integration and stores it therein. The digital signal processing circuit 69 further time integrates the fetched position signal, produces a new capstan driving signal in accordance with a result of the integration and stores it therein. Until a position holding section signal is outputted from the timing pulse generating circuit 57, the digital signal processing circuit 69 supplies and then continues to supply a new reference position signal to the D/A converting circuit 67 while the position holding section signal continues to be supplied thereto. Then, when a dynamic tracking section signal is outputted from the timing pulse generating circuit 57, the digital signal processing circuit 69 supplies a new capstan driving signal to the D/A converting circuit 68.

The D/A converting circuit 67 converts, when a reference position signal is supplied thereto from the digital signal processing circuit 69, the reference position signal from a digital into an analog signal and supplies the analog reference position signal to the subtracting circuit 64 of the galvano mirror controlling circuit 56.

The other D/A converting circuit 68 converts, when a capstan driving signal is supplied thereto from the digital signal processing circuit 69, the capstan driving signal from a digital into analog signal and supplies the analog capstan driving signal to the capstan motor controlling circuit 59.

The capstan motor driving circuit 59 includes a subtracting circuit 70, a control characteristic compensating circuit 71, a motor driving circuit 72 and a speed detecting circuit 73. The capstan motor driving circuit 59 adjusts, in response to a capstan driving signal supplied thereto from the signal processing circuit 58, the speed of rotation of the capstan motor 48 to a value designated by the capstan driving signal.

The subtracting circuit 70 calculates a difference of a capstan rotational speed detection signal outputted from the speed detecting circuit 73 from a capstan driving signal supplied thereto from the signal processing circuit 58 to produce a relative speed difference signal and supplies the relative speed difference signal to the control characteristic compensating circuit 71.

The control characteristic compensating circuit 71 performs preset control characteristic compensation for a relative position signal supplied thereto from the subtracting circuit 70 to produce a speed indicating signal and supplies the speed indicating signal to the motor driving circuit 72.

The motor driving circuit 72 produces a driving signal in response to a speed indicating signal supplied thereto from the control characteristic compensating circuit 71 to adjust the speed of rotation of the capstan motor 48 to a value designated by the speed designating signal.

Meanwhile, the speed detecting circuit 73 produces a capstan rotational speed detection signal representative of a speed of rotation of the capstan motor 48 in response to a FG signal supplied thereto from the frequency generator provided for the capstan motor 48 and supplies the capstan rotational speed detection signal to the subtracting circuit 70.

A tracking controlling operation of the optical tape recording and reproducing apparatus is described subsequently with reference to FIGS. 4 to 6.

First, when information is to be recorded onto a preformatted optical tape which has reference tracks or reproduced from the optical tape 8, the drum motor 30 and the rotator motor 25 start their operations in response to driving signals outputted from the optical system controlling section of the control circuit. Thus, the drum motor 30 and the rotator motor 25 are controlled to rotate such that the speed of rotation of the rotary drum 29 and the speed of rotation of the roof prism 26 make the ratio of 2:1. Further, in response to a capstan driving signal outputted from the signal processing circuit 58, the capstan motor controlling circuit 59 starts driving of the capstan motor 48 so that the capstan motor 48 rotates at a speed designated by the capstan driving signal.

Figure 4:
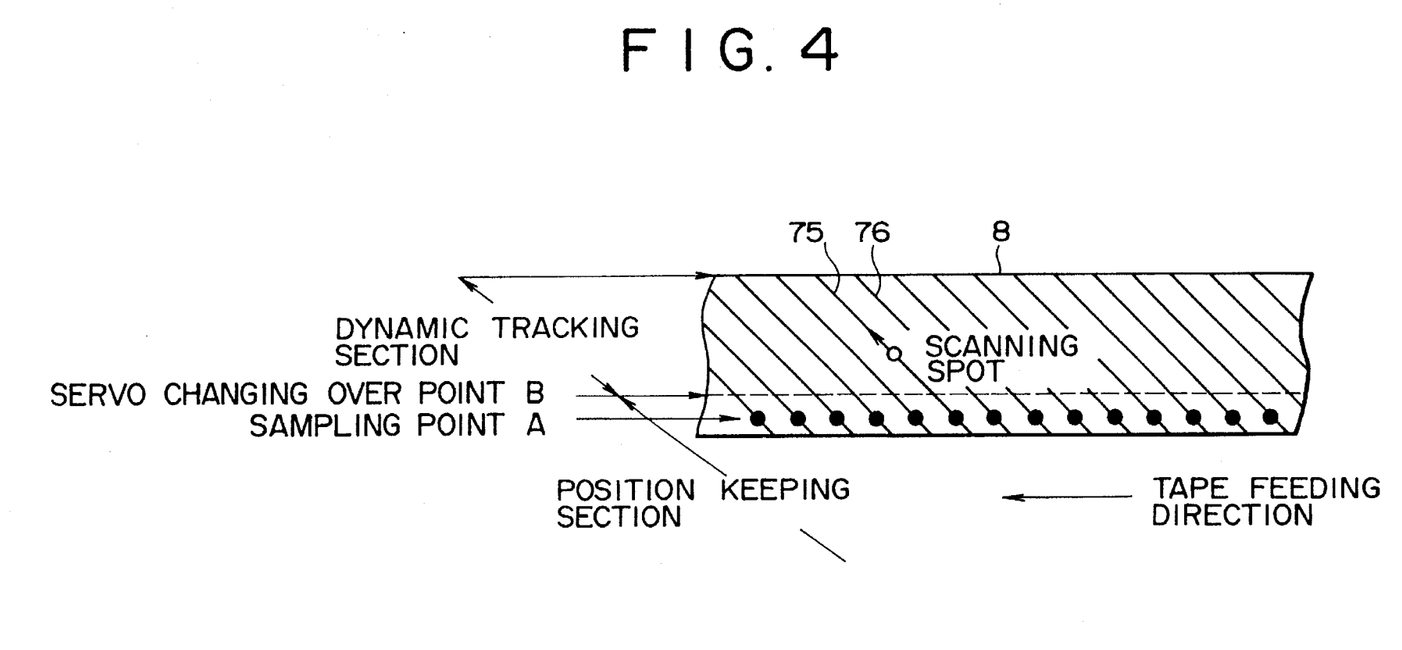
FIG. 4 is a schematic view illustrating a tracking operation of the optical tape recording and reproducing apparatus shown in FIG. 1.
Figure 5A:
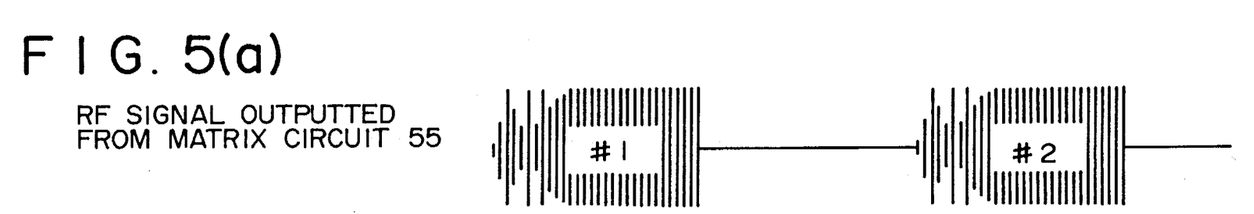
Figure 5B:
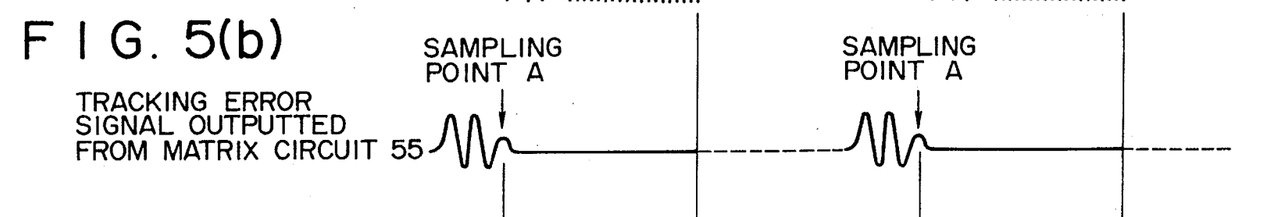
Figure 5C:
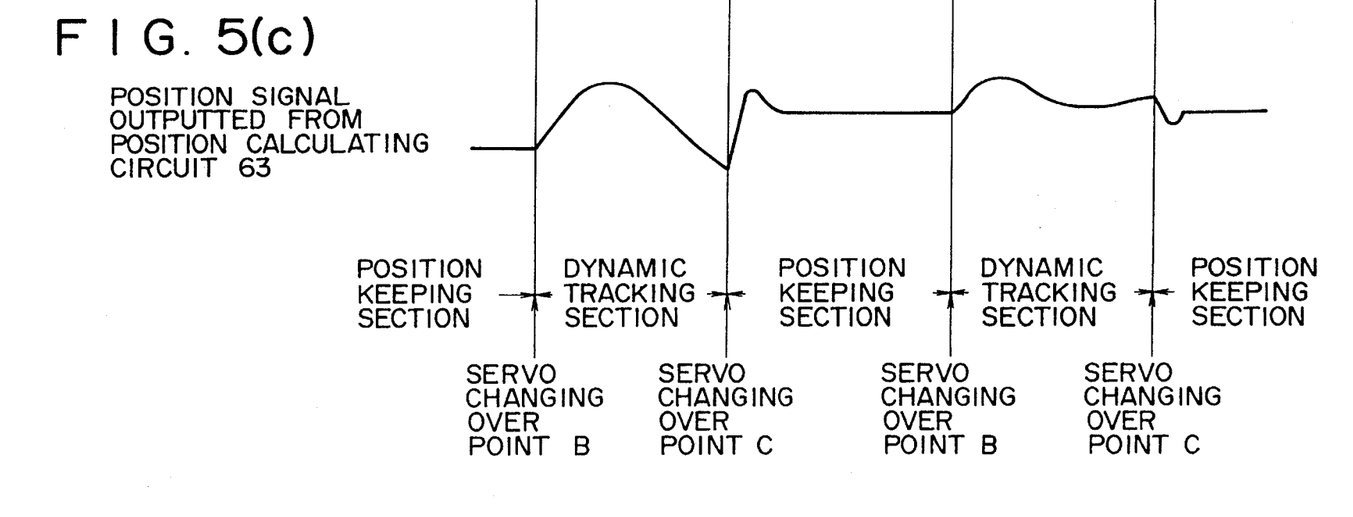
Figure 6:
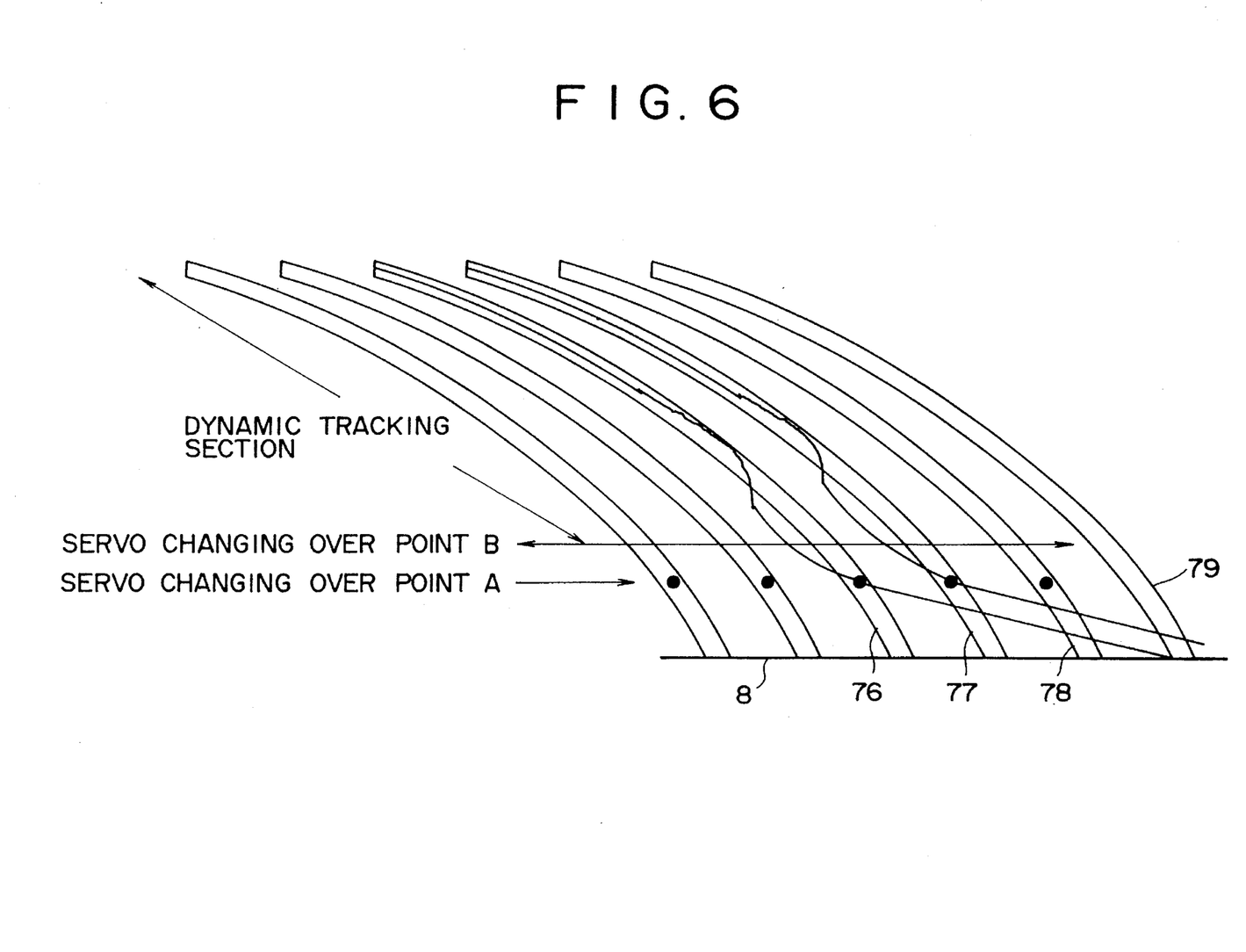
FIG. 6 is a diagrammatic view illustrating a tracking operation of the optical tape recording and reproducing apparatus shown in FIG. 1.

Then, if the speed of rotation of the rotary drum 29 and the speed Of rotation of the roof prism 26 become equal to the individual preset speeds and the speed of the optical tape 8 being fed becomes equal to a preset speed and besides a spot of a laser beam emitted from the rotary drum 29 comes to a position of an object track for recording or reproduction, for example, to the position of the point A of a track 75 as seen in FIG. 4, whereupon a sampling signal is outputted from the timing pulse generating circuit 57, then the signal processing circuit 58 constituting the control circuit operates to fetch a tracking error signal outputted from the matrix circuit 55 as seen from the curve (b) in FIG. 5, time integrates the tracking error signal and produces a new capstan driving signal in accordance with a result of the integration.

Then, before the next sampling signal is outputted from the timing pulse generating circuit 57, for example when a dynamic tracking section signal is outputted from the timing pulse generating circuit 57, the signal processing circuit 58 supplies to the capstan motor controlling circuit 59 the new capstan driving signal.

Then, if a position holding section signal is outputted from the timing pulse generating circuit 57, then the signal processing circuit 58 supplies to the galvano mirror controlling circuit 56 a new reference position signal obtained by sampling processing for the track 75.

Upon reception of the new reference position signal, the galvano mirror controlling circuit 56 calculates a difference of a current position of the galvano mirror 5 from the reference position signal and keeps the angular position of the galvano mirror 5 at a fixed value designated by the reference position signal.

Then, when the rotary drum 29 makes a substantially one complete rotation from the preceding sampling position so that the spot of the laser beam emitted from the rotary drum 29 comes to the position of a next object track for recording or reproduction, that is, to the position of the point A of a track 76, whereupon a next sampling signal is outputted from the timing pulse generating circuit 57, the signal processing circuit 58 fetches a tracking error signal outputted from the matrix circuit 55, time integrates the tracking error signal and produces a new reference position signal in accordance with a result of the integration. The signal processing circuit 58 further time integrates a position signal outputted from the galvano mirror controlling circuit 56 and produces a new capstan driving signal in accordance with a result of the integration.

Then, if a dynamic tracking section signal is outputted from the timing pulse generating circuit 57, then the signal processing circuit 58 supplies the new capstan driving signal obtained upon the sampling operation for the track 76 to the capstan motor controlling circuit 59 so that the speed of rotation of the capstan motor 48 may be equal to the speed of rotation designated by the capstan driving signal.

Further, while the dynamic tracking section signal continues to be outputted from the timing pulse generating circuit 57, the signal processing circuit 58 controls the angular position of the galvano mirror 5 in a dynamic fashion in response to a tracking error signal supplied thereto from the matrix circuit 55 so that the spot of the laser beam may be positioned on the track 76.

Then, if a position holding section signal is outputted from the timing pulse generating circuit 57, then the signal processing circuit 58 supplies a new reference position signal obtained by sampling processing for the track 76 to the galvano mirror controlling circuit 56.

Upon reception of the new reference position signal, the galvano mirror controlling circuit 56 calculates a difference of a current position of the galvano mirror 5 from the reference position signal and keeps the angular position of the galvano mirror 5 at a fixed value designated by the reference position signal.

The sequence of operations described above will thereafter be repeated to effect tracking processing for each track of the optical tape 8.

In this manner, in the optical tape recording and reproducing apparatus of the embodiment described above, each time the rotary drum 29 comes to the sampling point A, a tracking error signal and a position signal of the galvano mirror 5 are sampled and individually time integrated to produce a new reference position signal and a new capstan driving signal, and then, when the rotary drum 29 further rotates to enter the position holding section, the position of the galvano mirror 5 is controlled in accordance with the reference position signal, and the speed of rotation of the capstan motor 48 is controlled in accordance with the capstan driving signal. Consequently, dynamic tracking can be started at a position in the proximity of the center of each track as seen from FIG. 6. Consequently, the settling time upon leading-in of tracking can be minimized, and the recording or reproduction range can be increased to obtain a correct RF signal as seen from the curve (a) in FIG. 5. Further, the operation range of the galvano mirror 5 which serves as a tracking actuator can be kept small to achieve saving of power and miniaturization of the galvano mirror 5. In addition, a sudden variation of the feeding speed of the optical tape is eliminated to reduce the variation of the tension so that otherwise possible damage to the optical tape 8 can be minimized.

It is to be noted that, while the present invention is described above in connection with the preferred embodiment on the premise that the error of the angular position of the rotator motor 25 is small, otherwise when the error of the angular position of the rotator motor 25 is great, the reference position of the tracking actuator may be controlled individually for even-numbered rotation and odd-numbered rotation of the rotary drum 29.

Further, while the optical tape recording and reproducing apparatus of the embodiment described above is constructed such that a tracking error signal outputted from the matrix circuit 55 and a position signal outputted from the position calculating circuit 63 are time integrated to obtain a reference position signal and a capstan driving signal, respectively, such processing may be performed otherwise by calculation of a low frequency region gain compensating type filter or by such calculation together with additional digital calculating processing using a high frequency region phase compensating type filter in order to enhance the responsibility.

Furthermore, while the present invention is described above in connection with the embodiment which adopts a drum recording system of the external light source type, it may otherwise be applied to an optical tape recording and reproducing apparatus of some other type such as, for example, a recording system wherein a reel is built in a drum, which is disclosed in P. Vogelgsang and J. Hartmann, "Erasable optical tape feasibility study" SPIE, Optical Storage Technology and Application, vol. 899, pp.172–177, 1988.

Further, while, in the embodiment described above, the present invention is applied to an optical tape recording and reproducing apparatus of the helical scanning type, the present invention may otherwise be applied to optical tape recording and reproducing apparatus of some other types which have a free running section such as, for example, an optical tape recording and reproducing apparatus of the type wherein an optical tape is wrapped in a widthwise direction on a drum and further to some other record media than tapes such as sheet media and card media wherein the record medium is formed from a flat plate as is disclosed in Japanese Patent Laid-Open Application No. 59-223949.

Having now fully described the invention, it will be apparent to one of ordinary skill in the art that many changes and modifications can be made thereto without departing from the spirit and scope of the invention as set forth herein.

What is claimed is:

1. An optical tape recording and reproducing apparatus, comprising:

means for feeding an optical tape along a predetermined path;

a laser light source for producing a laser beam;

an optical system for focusing the laser beam from said laser light source upon a current track of the optical tape to optically record or reproduce information onto or from the optical tape and for receiving the laser beam reflected from the optical tape, said optical system including a tracking actuator mounted for movement from its central position to effect tracking of the laser beam;

first detecting means for dynamically detecting a displacement of the position of a spot of the laser beam at a predetermined sampling point of the current track of the optical tape from the center line of the current track, said displacement of the position of the spot from the center line being represented by a tracking error signal;

second detecting means for detecting a displacement of said tracking actuator from its central position; and control means for dynamically controlling the position of the spot of the laser beam with respect to the current track of the optical tape in response to the tracking error signal, for integrating over time the tracking error signal and for controlling the position of the spot of the laser beam with respect to a next track in response to a control signal produced by subtracting the displacement detected by said second detecting means from the tracking error signal integrated by said control means.

2. An optical tape recording and reproducing apparatus according to claim 1, wherein said second detecting means includes a second laser light source for generating a laser beam and directing the laser beam toward the rear face of said tracking actuator which serves as a mirror surface, and a light receiving element for receiving reflected laser light from the rear face of said tracking actuator to produce a one-dimensional position signal.

3. An optical tape recording and reproducing apparatus according to claim 2, wherein said second detecting means further includes position calculating means for calculating an angular position of said tracking actuator from a one-dimensional position signal received from said light receiving element, and means for comparing the angular position from said position calculating means with a reference position signal representative of the central position of said tracking actuator.

4. An optical tape recording and reproducing apparatus according to claim 1, wherein said control means includes a multiplexer circuit for selectivity outputting the output of said first detecting means and the control signal, a phase compensating circuit for compensating the phase of the output of said multiplexer circuit, and a driving circuit for driving said tracking actuator in accordance with the output of said phase compensating circuit to move to a position corresponding to the thus received output.

5. An optical tape recording and reproducing apparatus according to claim 4, further comprising third detecting means for detecting whether a rotary drum of said feeding means is in a position holding mode or a dynamic tracking mode, said multiplexer circuit being controlled by said control means in response to the output of said third detecting means.

6. A method of controlling the position of a spot of a laser beam on an optical tape in an optical tape recording and reproducing apparatus wherein the optical tape is fed and the laser beam is focused on a current track of the optical tape being fed to record or reproduce information onto or from the optical tape, comprising the steps of:

dynamically detecting a displacement of the position of the spot of the laser beam at a predetermined sampling point of the current track from the center line of the current track, said displacement of the position of the spot from the center line being represented by a tracking error signal;

detecting a displacement of a tracking actuator for effecting tracking of the laser beam from a central position of the tracking actuator in the range of movement thereof;

dynamically controlling the position of the spot of the laser beam with respect to the current track of the optical tape in response to the tracking error signal;

integrating the tracking error signal;

subtracting the detected displacement of the tracking actuator from the integrated tracking error signal to produce a control signal; and controlling the position of the spot of the laser beam with respect to a next track in response to the control signal.

* * * * *